(12) United States Patent
Tazuru et al.

(10) Patent No.: US 11,826,859 B2
(45) Date of Patent: Nov. 28, 2023

(54) BRAZING MATERIAL, BRAZING MEMBER, AND HEAT EXCHANGER

(71) Applicant: Harima Chemicals, Incorporated, Kakogawa (JP)

(72) Inventors: Aoi Tazuru, Hyogo (JP); Satoshi Moriya, Hyogo (JP); Daigo Kiga, Hyogo (JP)

(73) Assignee: HARIMA CHEMICALS, INCORPORATED, Kakogawa (JP)

( * ) Notice: Subject to any disclaimer, the term of this patent is extended or adjusted under 35 U.S.C. 154(b) by 0 days.

(21) Appl. No.: 17/633,635

(22) PCT Filed: Aug. 13, 2020

(86) PCT No.: PCT/JP2020/030799
§ 371 (c)(1),
(2) Date: Feb. 8, 2022

(87) PCT Pub. No.: WO2021/033624
PCT Pub. Date: Feb. 25, 2021

(65) Prior Publication Data
US 2022/0314378 A1    Oct. 6, 2022

(30) Foreign Application Priority Data
Aug. 20, 2019    (JP) ................. 2019-150324

(51) Int. Cl.
*B23K 35/28*    (2006.01)
*B23K 1/00*    (2006.01)
*B23K 35/36*    (2006.01)
*B23K 101/14*    (2006.01)

(52) U.S. Cl.
CPC ............ *B23K 35/28* (2013.01); *B23K 1/0012* (2013.01); *B23K 35/36* (2013.01); *B23K 2101/14* (2018.08)

(58) Field of Classification Search
None
See application file for complete search history.

(56) References Cited

U.S. PATENT DOCUMENTS 8,075,706 B2 * 12/2011 Akazawa ........... B23K 35/0244
148/23
2009/0165893 A1    7/2009 Akazawa et al.
2021/0187672 A1    6/2021 Nomura et al.

FOREIGN PATENT DOCUMENTS

| JP | S5333952 A | * | 3/1978 |
| JP | S5333952 A | | 3/1978 |
| JP | H09314380 A | * | 12/1997 |
| JP | H09314380 A | | 12/1997 |

(Continued)

OTHER PUBLICATIONS

International Search Report (PCT/ISA/210) with an English translation, and Written Opinion (PCT/ISA/237) dated Nov. 2, 2020, by the Japanese Patent Office as the International Searching Authority for International Application No. PCT/JP2020/030799. (10 pages).

(Continued)

*Primary Examiner* — Daniel J. Schleis
(74) *Attorney, Agent, or Firm* — BUCHANAN INGERSOLL & ROONEY PC

(57) ABSTRACT

A brazing material for brazing aluminum or an aluminum alloy includes fluoride-based flux, a solidifying agent, and a coating film uniformity agent, and is solid at 25° C.

6 Claims, 1 Drawing Sheet

(56) References Cited

FOREIGN PATENT DOCUMENTS

| JP | 6153777 B2 | 6/2017 |
| WO | 2007080160 A1 | 7/2007 |
| WO | 2018235906 A1 | 12/2018 |
| WO | 2020039497 A1 | 2/2020 |
| WO | 2020040128 A1 | 2/2020 |

OTHER PUBLICATIONS

Supplementary European Search Report dated Feb. 10, 2023, by the European Patent Office in corresponding European Patent Application No. 20853660 (2 pgs).

* cited by examiner

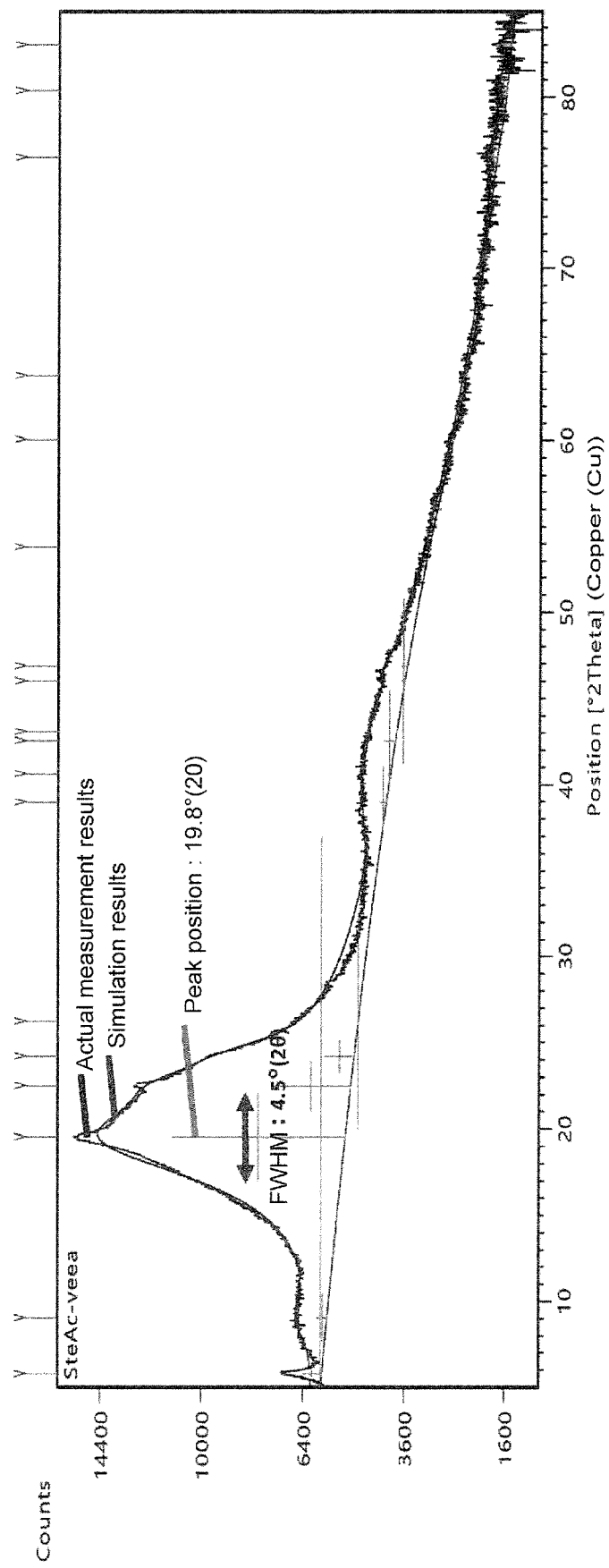

BRAZING MATERIAL, BRAZING MEMBER, AND HEAT EXCHANGER

TECHNICAL FIELD

The present invention relates to a brazing material, a brazing member, and a heat exchanger, to be specific, to a brazing material for brazing aluminum or an aluminum alloy, a brazing member including a coating film formed by applying the brazing material, and a heat exchanger including the brazing member.

BACKGROUND ART

Conventionally, flux is used to remove oxides of metal members that are welded when the metal members are welded.

Since the flux is usually liquid, the flux may flow when applied to a welding site. When the flux is liquid, a facility for drying a solvent is required to solidify a coating film, which may cause complication of the production line, and furthermore, the workability may be inferior due to scattering of the liquid flux and the like.

Therefore, in order to achieve simplification of the production line and improve the workability, it has been considered to use solid flux, and a brazing composition formed by uniformly blending a brazing material powder, a fluoride-based flux powder, and a solid wax at normal temperature has been, for example, proposed. (ref: for example, Patent Document 1 below).

CITATION LIST

Patent Document

Patent Document 1: Japanese Unexamined Patent Publication No. No. H9-314380

SUMMARY OF THE INVENTION

Problem to be Solved by the Invention

On the other hand, when the above-described blazing composition is applied to an object to be coated by bringing the blazing composition in a solid state into contact with the object to be coated and rubbing it as necessary, it is difficult to uniformly apply the blazing composition.

The present invention provides a brazing material with excellent coating uniformity, a brazing member including a coating film formed by applying the brazing material, and a heat exchanger including the brazing member.

Means for Solving the Problem

The present invention [1] includes a brazing material for brazing aluminum or an aluminum alloy, the brazing material including: fluoride-based flux; a solidifying agent; and a coating film uniformity agent, and being solid at 25° C.

The present invention [2] includes the brazing material described in [1], wherein the coating film uniformity agent has a full width at half maximum of 1° or more of a peak with the largest peak width in a range of diffraction angles of $(2\theta)19\pm2°$ in an X-ray diffraction pattern obtained at 10° C., and the coating film uniformity agent is at least one compound selected from the group consisting of an ester of a carboxylic acid having 10 or more carbon atoms and an alcohol having less than 8 carbon atoms, an ester of a carboxylic acid having less than 10 carbon atoms and an alcohol having 8 or more carbon atoms, and an acetal having 10 or more carbon atoms.

The present invention [3] includes the brazing material described in [1] or [2], wherein the coating film uniformity agent has a molecular weight of 1000 or less.

The present invention [4] includes the brazing material described in any one of the above-described [1] to [3], wherein the full width at half maximum of the coating film uniformity agent is 1° or more and 10° or less.

The present invention [5] includes the brazing material described in any one of the above-described [1] to [4], further including: a brazing material powder, wherein the brazing material powder consists of a metal capable of forming a eutectic alloy with aluminum, and/or an alloy of the metal and the aluminum.

The present invention [6] includes a brazing member including: aluminum or an aluminum alloy; and a coating film formed by applying the brazing material described in any one of the above-described [1] to [5] to the aluminum or the aluminum alloy.

The present invention [7] includes a heat exchanger including the brazing member described in [6].

Effects of the Invention

The brazing material of the present invention includes a fluoride-based flux, a solidifying agent, and a coating film uniformity agent, and is solid at 25° C. Thus, the brazing material has excellent coating uniformity.

The brazing member of the present invention includes a coating film formed by applying the brazing material of the present invention. Thus, the brazing member is provided with excellent coating uniformity.

The heat exchanger of the present invention is obtained by using the brazing member of the present invention. The heat exchanger is provided with excellent coating uniformity.

BRIEF DESCRIPTION OF THE DRAWINGS

FIG. 1 shows an X-ray diffraction pattern at 10° C. of stearyl aldehyde methylethyl diethyl ether acrylate=acetal obtained in Synthesis Example 1.

DESCRIPTION OF THE EMBODIMENTS

The brazing material of the present invention is a brazing material for brazing aluminum or an aluminum alloy, and includes a fluoride-based flux, a solidifying agent, and a coating film uniformity agent.

Examples of the fluoride-based flux include Cs—Al—F flux, K—Al—F flux, and K—Zn—F flux.

The Cs—Al—F flux is fluoride-based flux containing cesium (Cs), aluminum (Al), and fluorine (F), and an example thereof includes cesium fluoroaluminate (non-reactive cesium-based flux). Specific examples thereof include $CsAlF_4$, $Cs_2AlF_5$, and $Cs_3AlF_6$.

The K—Al—F flux is fluoride-based flux containing potassium (K), aluminum (Al), and fluorine (F), and an example thereof includes potassium fluoroaluminate. Specific examples thereof include $KAlF_4$, $K_2AlF_5$, and $K_3AlF_6$.

The K—Zn—F flux is fluoride-based flux containing potassium (K), zinc (Zn), and fluorine (F), and an example thereof includes fluorine potassium zincate. A specific example thereof includes $KZnF_3$.

As the fluoride-based flux, preferably, K—Al—F flux is used.

These fluoride-based fluxes may be used alone or in combination of two or more.

A mixing ratio of the fluoride-based flux with respect to the total amount of the fluoride-based flux, the solidifying agent, and the coating film uniformity agent (hereinafter, the fluoride-based flux, the solidifying agent, and the coating film uniformity agent are collectively referred to as a "brazing component") is, for example, 1% by mass or more, preferably 10% by mass or more, more preferably 20% by mass or more, further more preferably 30% by mass or more from the viewpoint of brazing properties (shortage of brazing), and is, for example, 80% by mass or less, preferably 60% by mass or less from the viewpoint of coating uniformity.

A content ratio of the brazing component with respect to the total amount of the brazing material is, for example, 50% by mass or more, preferably 70% by mass or more, and is, for example, 100% by mass or less. In a case where the brazing material includes a brazing filler metal to be described later, the content ratio of the brazing component with respect to the total amount of the brazing material is preferably 90% by mass or less, more preferably 80% by mass or less.

The solidifying agent is a component of adjusting a melting temperature so that the brazing material is solid at 25° C. and improving shape retention (excluding a gelling agent). In the present invention, 25° C. is a normal temperature. In addition, being in a solid state at 25° C. may be referred to as "normal temperature solid".

In the present invention, the solidifying agent is defined as at least one compound selected from the group consisting of a normal temperature solid hydrocarbon, a normal temperature solid alkyl alcohol, a normal temperature solid ether alcohol, and a high carbon carboxylic acid-high carbon alcohol ester.

Examples of the normal temperature solid hydrocarbon include normal temperature solid waxes such as a natural wax and a synthetic wax.

Examples of the natural wax include petroleum waxes such as a paraffin wax and a microcrystalline wax.

Examples of the synthetic wax include a polyethylene wax and a Fischer-Tropsch wax.

These normal temperature solid hydrocarbons may be used alone or in combination of two or more.

As the normal temperature solid hydrocarbon, preferably, a natural wax is used, more preferably, a paraffin wax is used.

A mixing ratio of the normal temperature solid hydrocarbon with respect to the total amount of the brazing component is, for example, 1% by mass or more, preferably 5% by mass or more, more preferably 10% by mass or more, further more preferably 20% by mass or more, further more preferably 30% by mass or more from the viewpoint of shape retention and coating uniformity, and is, for example, 99% by mass or less, more preferably, 98% by mass or less, further more preferably, 95% by mass or less.

A mixing ratio of the normal temperature solid hydrocarbon with respect to 100 parts by mass of the fluoride-based flux is, for example, 10 parts by mass or more, preferably 20 parts by mass or more, more preferably 100 parts by mass or more, further more preferably 150 parts by mass or more, and is, for example, 2000 parts by mass or less, preferably 1000 parts by mass or less, more preferably 500 parts by mass or less, further more preferably 300 parts by mass or less.

Examples of the normal temperature solid alkyl alcohol include normal alcohols having 14 to 30 carbon atoms (straight-chain alkyl alcohols) such as tetradecanol, hexadecanol, octadecanol (stearyl alcohol), and eicosanol; normal dialcohols having 6 to 30 carbon atoms such as 1,6-hexanediol; and polyhydric alcohols having 5 to 30 carbon atoms such as trimethylolpropane and pentaerythritol.

These normal temperature solid alkyl alcohols may be used alone or in combination of two or more.

A mixing ratio of the normal temperature solid alkyl alcohol with respect to the total amount of the brazing component is, for example, 1% by mass or more, preferably 5% by mass or more, more preferably 12% by mass or more, further more preferably 20% by mass or more, further more preferably 30% by mass or more from the viewpoint of shape retention and coating uniformity, and, for example, 99% by mass or less, more preferably 98% by mass or less, further more preferably 95% by mass or less.

Further, a mixing ratio of the normal temperature solid alkyl alcohol with respect to 100 parts by mass of the fluoride-based flux is, for example, 10 parts by mass or more, preferably 20 parts by mass or more, more preferably 35 parts by mass or more, further more preferably 100 parts by mass or more, and is, for example, 2000 parts by mass or less, preferably 1000 parts by mass or less, more preferably 500 parts by mass or less, further more preferably 300 parts by mass or less.

Examples of the normal temperature solid ether alcohol include polyether alcohols including polyether glycols such as polyoxyethylene glycol, polyoxypropylene glycol, and polyoxybutylene glycol and polyether monools such as polyethylene glycol monomethyl ether and polyethylene glycol monoethyl ether.

A molecular weight of the polyether alcohol is adjusted so as to be in a solid state at 25° C. For example, in a normal temperature solid ether alcohol, a weight average molecular weight of the polyoxyethylene glycol is 1000 or more.

These normal temperature solid ether alcohols may be used alone or in combination of two or more.

A mixing ratio of the normal temperature solid ether alcohol with respect to the total amount of the brazing component is, for example, 1% by mass or more, preferably 5% by mass or more, more preferably 12% by mass or more, further more preferably 20% by mass or more, further more preferably 30% by mass or more from the viewpoint of shape retention and coating uniformity, and is, for example, 99% by mass or less, more preferably 98% by mass or less, further more preferably 95% by mass or less.

Further, a mixing ratio of the normal temperature solid ether alcohol with respect to 100 parts by mass of the fluoride-based flux is, for example, 10 parts by mass or more, preferably 20 parts by mass or more, more preferably 35 parts by mass or more, further more preferably 100 parts by mass or more, and is, for example, 2000 parts by mass or less, preferably 1000 parts by mass or less, more preferably 500 parts by mass or less, further more preferably 300 parts by mass or less.

The high carbon carboxylic acid-high carbon alcohol ester is an ester which is a reaction product of a carboxylic acid having 10 or more carbon atoms (described later) and an alcohol having 8 or more carbon atoms (described later).

More specifically, the high carbon carboxylic acid-high carbon alcohol ester is solid at 25° C. (normal temperature solid) and is an ester having a relatively high crystallinity at 10° C. In detail, the high carbon carboxylic acid-high carbon alcohol ester is an ester having a full width at half maximum of less than 1° of a peak with the largest peak area width in a range of diffraction angles of $(2\theta)19\pm2°$ in an X-ray diffraction pattern obtained at 10° C. and described below.

Such a high carbon carboxylic acid-high carbon alcohol ester improves the shape retention of the brazing material.

The high carbon carboxylic acid-high carbon alcohol ester is obtained by an esterification reaction of 1 or more molecules of a carboxylic acid having 10 or more carbon atoms (described later) and 1 or more molecules of an alcohol having 8 or more carbon atoms (described later) by a known method.

More specifically, examples of the high carbon carboxylic acid-high carbon alcohol ester include a carnauba wax, a candelilla wax, and a triacontanyl palmitate.

These high carbon carboxylic acid-high carbon alcohol esters may be used alone or in combination of two or more.

A mixing ratio of the high carbon carboxylic acid-high carbon alcohol ester with respect to the total amount of the brazing component is, for example, 1% by mass or more, preferably 5% by mass or more, more preferably 12% by mass or more, further more preferably 20% by mass or more, further more preferably 30% by mass or more from the viewpoint of shape retention and coating uniformity, and is, for example, 99% by mass or less, more preferably 98% by mass or less, further more preferably 95% by mass or less.

A mixing ratio of the high carbon carboxylic acid-high carbon alcohol ester with respect to 100 parts by mass of the fluoride-based flux is, for example, 10 parts by mass or more, preferably 20 parts by mass or more, more preferably 35 parts by mass or more, further more preferably 100 parts by mass or more, and is, for example, 2000 parts by mass or less, preferably 1000 parts by mass or less, more preferably 500 parts by mass or less, further more preferably 300 parts by mass or less.

These solidifying agents may be used alone or in combination of two or more.

As the solidifying agent, preferably, a normal temperature solid hydrocarbon is used alone and a normal temperature solid alkyl alcohol is used alone. As the solidifying agent, a normal temperature solid hydrocarbon and a normal temperature solid alkyl alcohol can also be used in combination. When a normal temperature solid hydrocarbon and a normal temperature solid alkyl alcohol are used in combination, a mixing ratio of the normal temperature solid hydrocarbon and a mixing ratio of the normal temperature solid alkyl alcohol are appropriately adjusted within the above-described range.

A mixing ratio (total amount) of the solidifying agent with respect to 100 parts by mass of the fluoride-based flux is, for example, 10 parts by mass or more, preferably 20 parts by mass or more, more preferably 35 parts by mass or more, further more preferably 100 parts by mass or more, and is, for example, 2000 parts by mass or less, preferably 1000 parts by mass or less, more preferably 500 parts by mass or less, further more preferably 300 parts by mass or less.

The coating film uniformity agent is a component that improves the uniformity (homogeneity) of the coating film by making the brazing material easily crumble by reducing the interaction in the solidifying agent in the brazing component. The state of the coating film uniformity agent at a room temperature (25° C.) is not especially limited, and may be solid or liquid.

The above-described coating film uniformity agent is solid at 10° C. and has a relatively low crystallinity.

More specifically, an organic compound having crystallinity represents an organic compound with a degree of crystallinity of 0 or more and the degree of crystallinity is defined by peak area derived from crystallinity/(peak area derived from crystallinity+peak area derived from non-crystallinity) at diffraction angles of $(2\theta)5°$ to $85°$ in an X-ray diffraction pattern obtained at 10° C.

Further, among the organic compounds having the above-described crystallinity, the coating film uniformity agent (organic compound having a relatively low crystallinity) is defined as an organic compound having a full width at half maximum of 1° or more of a peak with the largest peak area width in a range of diffraction angles of $(2\theta)19\pm2°$ in an X-ray diffraction pattern obtained at 10° C.

Specifically, the above-described full width at half maximum of the coating film uniformity agent is, for example, 1° or more, preferably 1.5° or more, more preferably 2.0° or more, further more preferably 3.5° or more, and the upper limit thereof is not especially limited, and is, for example, 10° or less, preferably 9.0° or less, more preferably 8.0° or less, further more preferably 6.0° or less, particularly preferably 5.0° or less.

In the present invention, the coating film uniformity agent is at least one compound selected from the group consisting of a high carbon carboxylic acid-low carbon alcohol ester, a low carbon carboxylic acid-high carbon alcohol ester, and a high carbon acetal.

In other words, in the present invention, the above-described full width at half maximum of the coating film uniformity agent is 1° or more, and is defined as at least one compound selected from the group consisting of a high carbon carboxylic acid-low carbon alcohol ester, a low carbon carboxylic acid-high carbon alcohol ester, and a high carbon acetal. The coating film uniformity agent is distinguished from the above-described solidifying agent by chemical structure. In other words, the coating film uniformity agent does not include the above-described solidifying agent. The coating film uniformity agent is distinguished also from a surfactant by chemical structure. In other words, the coating film uniformity agent does not include a surfactant.

The high carbon carboxylic acid-low carbon alcohol ester is an ester that is a reaction product of a carboxylic acid having 10 or more carbon atoms and an alcohol having less than 8 carbon atoms.

In the high carbon carboxylic acid-low carbon alcohol ester, examples of the carboxylic acid having 10 or more carbon atoms include monocarboxylic acids having 10 or more carbon atoms such as capric acid, lauric acid, myristic acid, palmitic acid, stearic acid, and lignoceric acid; and dicarboxylic acids having 10 or more carbon atoms such as decanedioic acid and dodecanedioic acid, and anhydrides thereof. These may be used alone or in combination of two or more.

Specifically, the number of carbon atoms of the carboxylic acid is 10 or more, preferably 14 or more, more preferably 16 or more, further more preferably 18 or more.

In the high carbon carboxylic acid-low carbon alcohol ester, examples of the alcohol having less than 8 carbon atoms include monohydric alcohols having less than 8 carbon atoms such as methyl alcohol, ethyl alcohol, propyl alcohol, butyl alcohol, pentyl alcohol, hexyl alcohol, heptyl alcohol, and 3-methoxy-3-methyl-1-butyl alcohol, and polyhydric alcohols having less than 8 carbon atoms such as methane diol, ethane diol, propane diol, butane diol, pentane diol, neopentyl glycol, hexane diol, and heptane diol. These may be used alone or in combination of two or more.

Specifically, the number of carbon atoms of the alcohol is less than 8, preferably 7 or less, more preferably 6 or less, further more preferably 4 or less.

The high carbon carboxylic acid-low carbon alcohol ester is obtained by an esterification reaction of 1 or more molecules of a carboxylic acid having 10 or more carbon atoms and 1 or more molecules of an alcohol having less than 8 carbon atoms in the presence of a known ester catalyst under appropriate conditions.

More specific examples of the high carbon carboxylic acid-low carbon alcohol ester include myristic acid esters such as methyl myristate (full width at half maximum of 3.4°), and methoxymethylbutane myristate (full width at half maximum of 1.1°), palmitate esters such as methyl palmitate (full width at half maximum of 3.4°), stearic acid esters such as methyl stearate (full width at half maximum of 3.3°), butyl stearate (full width at half maximum of 3.8°), methoxy methyl butane stearate (full width at half maximum of 1.1°), dicapric acid esters such as butyl dicaprate (full width at half maximum of 2.0°), hexyl dicaprate (full width at half maximum of 1.5°), and lignoceric acid esters such as methyl lignocerate (full width at half maximum of 3.0°). These may be used alone or in combination of two or more.

The low carbon carboxylic acid-high carbon alcohol ester is an ester that is a reaction product of a carboxylic acid having less than 10 carbon atoms and an alcohol having 8 or more carbon atoms.

In the low carbon carboxylic acid-high carbon alcohol ester, examples of the carboxylic acid having less than 10 carbon atoms include monocarboxylic acids having less than 10 carbon atoms such as formic acid, acetic acid, propionic acid, butyric acid, valeric acid, caproic acid, caprylic acid, acrylic acid, and methacrylic acid, and dicarboxylic acids having less than 10 carbon atoms such as phthalic acid, isophthalic acid, terephthalic acid, hydrogenated phthalic acid, hydrogenated isophthalic acid, and hydrogenated terephthalic acid, and anhydrides thereof. These may be used alone or in combination of two or more.

Specifically, the number of carbon atoms of the carboxylic acid is less than 10, preferably 9 or less, more preferably 5 or less.

In the low carbon carboxylic acid-high carbon alcohol ester, examples of the alcohol having 8 or more carbon atoms include monohydric alcohols having 8 or more carbon atoms such as octyl alcohol, lauryl alcohol, myristyl alcohol, cetyl alcohol, stearyl alcohol, oleyl alcohol, and linoleyl alcohol, and polyhydric alcohols having 8 or more carbon atoms such as octane diol, nonane diol, decane diol, and dodecane diol. These may be used alone or in combination of two or more.

Specifically, the number of carbon atoms of the alcohol is 8 or more, preferably 14 or more, more preferably 18 or more.

Then, the low carbon carboxylic acid-high carbon alcohol ester is obtained by an esterification reaction of 1 or more molecules of a carboxylic acid having less than 10 carbon atoms and 1 or more molecules of an alcohol having 8 or more carbon atoms in the presence of a known ester catalyst under appropriate conditions.

More specific examples of the low carbon carboxylic acid-high carbon alcohol ester include hydrogenerated stearyl phthalate (full width at half maximum of 3.5°), hydrogenerated lauryl phthalate (full width at half maximum of 3.0°), and methacrylic acid stearyl (stearyl methacrylate (full width at half maximum of)1.0°). These may be used alone or in combination of two or more.

The high carbon acetal is an acetal having 10 or more carbon atoms.

Specifically, the number of carbon atoms of the aldehyde or ketone of the high carbon acetal is 10 or more, preferably 14 or more, more preferably 18 or more.

More specific examples of the high carbon acetal include acetals having 10 to 30 carbon atoms such as stearyl aldehyde methylethyl diethyl ether acrylate=acetal (SteAc-VEEA, full width at half maximum of 4.5°), and stearyl aldehyde methylethyl diethyl ether methacrylate=acetal (SteAc-VEEM, full width at half maximum of 4.5°). These may be used alone or in combination of two or more.

The high carbon acetal is obtained, for example, by an acetalization reaction of 1 or more molecules of a carboxylic acid having 10 or more carbon atoms and a (meth)acrylate (such as vinyletherethoxy (meth)acrylate) in the presence of a catalyst, as necessary, under appropriate conditions.

These coating film uniformity agents may be used alone or in combination of two or more.

As the coating film uniformity agent, preferably the high carbon carboxylic acid-low carbon alcohol ester, more preferably stearic acid ester is used.

From the viewpoint of coating uniformity, a molecular weight of the coating film uniformity agent is, for example, 20 or more, preferably 50 or more and, for example, 1000 or less, preferably 500 or less.

When the coating film uniformity agent is a monomer, the molecular weight thereof can be calculated from the molecular skeleton and the number of atoms. When the coating film uniformity agent is a polymer, the molecular weight thereof as a number average molecular weight is determined as a molecular weight in terms of standard polystyrene by gel permeation chromatography measurement. Then, the molecular weight of the coating film uniformity agent is calculated as an average value of the molecular weights of the components.

A content ratio of the coating film uniformity agent with respect to the total amount of the brazing material is, for example, 60% by mass or less, preferably 55% by mass or less, more preferably 50% by mass or less, further more preferably 40% by mass or less, particularly preferably 25% by mass or less, and for example, 1% by mass or more, preferably 5% by mass or more, more preferably 10% by mass or more, further more preferably 15% or more.

Further, a content ratio of the coating film uniformity agent with respect to 100 parts by mass of the total amount of the solidifying agent is, for example, 1 parts by mass or more, preferably 5 parts by mass or more, more preferably 8 parts by mass or more and, for example, 100 parts by mass or less, preferably 80 parts by mass or less, more preferably 50 parts by mass or less from the viewpoint of coating uniformity.

Further, a mixing ratio of the coating film uniformity agent with respect to 100 parts by mass of the fluoride-based flux is, for example, 1 parts by mass or more, preferably 5 parts by mass or more, more preferably 8 parts by mass or more and is, for example, 100 parts by mass or less, preferably 80 parts by mass or less, more preferably 50 parts by mass or less.

These coating film uniformity agents may be used alone or in combination of two or more.

In addition, if necessary, the brazing material can include a brazing filler metal.

Examples of the brazing filler metal include a brazing filler metal made of a metal that can form a eutectic alloy with aluminum, and a brazing filler metal made of an alloy of the metal and the aluminum.

More specifically, examples of the brazing filler metal include a metal silicon, a silicon-aluminum alloy, and these alloys containing a small amount of magnesium, copper, and germanium.

Further, the brazing filler metal is preferably prepared in a powder form. That is, as the brazing filler metal, preferably, a brazing filler metal powder is used. An average particle size of the brazing metal filler powder is not particularly limited, and is appropriately set in accordance with the purpose and the application.

When the brazing material includes the brazing filler metal, it has excellent work efficiency in the brazing of the aluminum and the aluminum alloy.

A mixing ratio of the brazing filler metal with respect to 100 parts by mass of the brazing component is, for example, 3 parts by mass or more, preferably 5 parts by mass or more, more preferably 10 parts by mass or more, and is, for example, 300 parts by mass or less, preferably 100 parts by mass or less, more preferably 50 parts by mass or less, further more preferably 45 parts by mass or less.

Further, a mixing ratio of the brazing filler metal with respect to the total amount of the brazing material is, for example, 1% by mass or more, preferably 10% by mass or more, more preferably 20% by mass or more, and is, for example, 60% by mass or less, preferably 40% by mass or less, more preferably 30% by mass or less.

In addition, the brazing material may contain, if necessary, various additives at a ratio of 5% by mass or less with respect to the total amount of the brazing material. Examples of the additive include antioxidants (for example, dibutylhydroxytoluene and the like), corrosion inhibitors (for example, benzotriazole and the like), defoaming agents (for example, silicone oil and the like), thickeners (for example, fatty acid amide, polyamide, and the like), and colorants.

Then, the brazing material can be obtained by mixing and stirring each of the above-described components at the above-described mixing ratio by a known method. At this time, the fluoride-based flux, the solidifying agent, and the coating film uniformity agent are uniformly mixed, and thereafter the brazing material is solidified by the solidifying agent. That is, the above-described brazing material is solid, and specifically, is solid at 25° C.

In the above-described brazing material, the coating film uniformity agent reduces the interaction in the solidifying agent, and thus the brazing material tends to easily crumble.

Solid at 25° C. is defined as "not in liquid form" as a result of the test conducted at 25° C. in accordance with the method described in the "Method of Confirmation of Liquid Status" described in the "Notice No. 11 of the Office of Hazardous Materials Regulation-Cabinet Order for Partial Revision of the Cabinet Order Concerning the Control of Hazardous Materials (Part Relating to Examination and Property of Hazardous Materials) and the Promulgation of the Ministerial Order on Examination and Property of Hazardous Materials (Notification)".

The brazing material is softened by heating.

More specifically, for example, when the above-described brazing material is applied to the aluminum or the aluminum alloy, the solid brazing material may be melted by heating and used although it may also be used in a solid state as described in detail later.

A heating temperature is, for example, 40° C. or more, preferably 60° C. or more, more preferably 70° C. or more, further more preferably 80° C. or more, particularly preferably 90° C. or more, and is, for example, 400° C. or less, preferably 300° C. or less, more preferably 200° C. or less, further more preferably 180° C. or less, particularly preferably 150° C. or less.

That is, particularly preferably, the above-described brazing material is melted at 150° C. or less. In other words, the brazing material is preferably in a melting state at least at 150° C.

In such a case, the viscosity at 150° C. (melting state) of the brazing material is, for example, 0.001 Pa·s or more, preferably 0.003 Pas or more, more preferably 0.006 Pa·s or more, further more preferably 0.02 Pas or more, particularly preferably 0.05 Pa·s or more, and is, for example, 300 Pa·s or less, preferably 100 Pa·s or less.

When the viscosity at 150° C. is within the above-described range, particularly excellent coating uniformity can be obtained.

The viscosity at 150° C. is measured with a rheometer.

The above-described brazing material contains the fluoride-based flux, the solidifying agent, and the coating film uniformity agent, and is solid at 25° C. Thus, excellent coating uniformity can be obtained.

Hence, the above-described brazing material is used to braze a member (Al member) made of aluminum or an aluminum alloy.

More specifically, for example, the above-described brazing material is melted by heating and applied on the object to be coated by a jet dispenser, or is pressed in a solid state and applied on the object to be coated without melting.

Preferably, the above-described brazing material is pressed in a solid state and applied on the object to be coated without melting. In such a case, an example of the application method includes a method in which, as described in International Publication WO2018/235906, a member (Al member) made of aluminum or an aluminum alloy is wound with a roll-type conveyance device or the like in a state where the Al member and the brazing material in a solid state are in contact with each other, and the Al member is relatively moved with respect to the brazing material. By the method, the solid brazing material is shaved, and the shaved brazing material is attached (applied) to the Al member.

Then, by using the above-described brazing material, excellent coating uniformity is achieved when the brazing material is applied on an object to be coated by bringing the brazing material in a solid state into contact with the object to be coated.

Thus, the above-described brazing material is suitably used for aluminum or aluminum alloy products. Specifically, the above-described brazing material is suitably used for the production of brazing members including the above-described aluminum or aluminum alloy, and the production of heat exchangers using the brazing member.

Further, the obtained brazing member includes the above-described coating film formed by applying the brazing material, and thus is provided with excellent coating uniformity. The heat exchanger is produced by using the above-described brazing member, and thus is provided with excellent coating uniformity.

EXAMPLE

The present invention will be more specifically described below with reference to Examples and Comparison Examples. The present invention is not limited to Examples and Comparison Examples in any way. The specific numeral values used in the description below, such as mixing ratios (contents), physical property values, and parameters can be replaced with corresponding mixing ratios (contents), physical property values, parameters in the above-described "DESCRIPTION OF THE EMBODIMENTS", including the upper limit values (numeral values defined with "or less", and "less than") or the lower limit values (numeral values defined with "or more", and "more than").

1. Measurement Method (1) Full Width at Half Maximum (Half Width)

The coating film uniformity agent is subjected to an X-ray analysis under the following conditions.

More specifically, the coating film uniformity agent was melted and fed into a 3 cm square mold, and crystallized at 10° C. for 1 day.

The sample obtained in the above-described manner was subjected to an XRD (X-ray Diffraction) analysis at 10° C. to measure its diffraction peaks. Based on this, fitting was carried out by dividing the peaks with a division width of (2θ)0.5° to assign the peak of the coating film uniformity agent and measure the full width at half maximum of the peak.

In this manner, "the full width at half maximum of the peak with the largest peak width in a range of diffraction angles of (2θ)19±2° in the X-ray diffraction pattern obtained under conditions of 10° C." was obtained.

The measurement conditions are given as follows.

Light source: Empyrean X-ray tube, Electricity use: 40 kV 15 mA, X-ray exposure time: 260 seconds, Detector: Medipix 3 PIXcel detector, Measurement range: 5° to 85°, Step size: 0.0027166°2θ, Goniometer radius: 145 mm The X-ray diffraction pattern at 10° C. of stearyl aldehyde methylethyl diethyl ether acrylate=acetal obtained in Synthesis Example 1 described below is shown in FIG. 1.

2. Synthesis of Coating Film Uniformity Agent

Synthesis Example 1

60 parts of stearic acid (trade name STEARIC ACID 98%, manufactured by MIYOSHI OIL & FAT CO., LTD.) and 40 parts of vinyletherethoxyacrylate (trade name: VEEA, manufactured by NOF CORPORATION) were mixed and heated to 100° C., and reacted for 5 hours, thereby obtaining stearyl aldehyde methylethyl diethyl ether acrylate=acetal (hereinafter, referred to as SteAC-VEEA. a full width at half maximum of 4.5°, a molecular weight of 470).

Synthesis Example 2

60 parts of stearic acid (trade name STEARIC ACID 98%, manufactured by MIYOSHI OIL & FAT CO., LTD.) and 40 parts of vinyletherethoxymethacrylate (trade name: VEEM, manufactured by NOF CORPORATION) were mixed and thereafter reacted in the same manner as Synthesis Example 1, thereby obtaining stearyl aldehyde methylethyl diethylether methacrylate=acetal (hereinafter, referred to as SteAC-VEEM. a full width at half maximum of 4.5°, a molecular weight of 484).

Synthesis Example 3

70.6 parts of stearic acid (trade name STEARIC ACID 98%, manufactured by M IYOSHI OIL & FAT CO., LTD.) and 29.4 parts of 3-methoxy-3-methyl-1-butyl alcohol (trade name: SOLFIT, manufactured by KURARAY CO., LTD.) were mixed, and 0.05 parts of an ester catalyst (trade name: IRGANOX 1425, manufactured by BASF) was added thereto. The mixture was heated to 160° C. and stirred for 12 hours, thereby obtaining methoxy methyl butane stearate (a full width at half maximum of 1.1°, a molecular weight of 384).

Synthesis Example 4

79.3 parts of capric acid (trade name: capric acid 98, manufactured by MIYOSHI OIL & FAT CO., LTD.) and 20.7 parts of butane diol (trade name: 1st grade 1,4-butane diol, manufactured by KISHIDA CHEMICAL Co., Ltd.) were mixed and reacted in the same manner as Synthesis Example 3, thereby obtaining butyl dicaprate (a full width at half maximum of 2.0°, a molecular weight of 398).

Synthesis Example 5

74.5 parts of capric acid (trade name: capric acid 98, manufactured by MIYOSHI OIL & FAT CO., LTD.) and 25.5 parts of hexane diol (trade name: 1,6-hexane diol, manufactured by Ube Industries, Ltd.) were mixed and reacted in the same manner as Synthesis Example 3, thereby obtaining hexyl dicaprate (a full width at half maximum of 1.5°, a molecular weight of 426).

Synthesis Example 6

63.7 parts of stearyl alcohol (trade name: KALCOL 8098, Kao Corporation) and 36.3 parts of a hydrophthalic anhydride (trade name: RIKACID HH, manufactured by New Japan Chemical Co., Ltd.) were mixed, and 0.05 parts of triphenylphosphine (trade name: PP-360, manufactured by K⊇I Chemical Industry Co., LTD.) was added as a catalyst thereto. The mixture was reacted at 120° C. for 8 hours, thereby obtaining anhydrous stearyl phthalate (a full width at half maximum of 3.5°, a molecular weight of 438).

3. Production of Brazing Material

Example 1

Following the formulations shown in Table 1, a brazing material was produced.

Specifically, 50.0 parts of aluminate fluoride potassium flux, 45.0 parts of a paraffin wax, and 5.0 parts of SteAC-VEEA of the above-described Synthesis Example 1 as the coating film uniformity agent were heated, mixed, and poured into a predetermined mold, and cooled and molded, thereby obtaining a brazing material.

The brazing material was solid at 25° C.

Example 2 to Example 19 and Comparative Example 1 to Comparative Example 2

Except that the formulations were changed to those of Tables 1 and 2, brazing materials were produced in the same manner as Example 1.

The brazing filler metal Al-12% Si was an Al brazing filler metal containing 12% of Si (trade name: ECKA Aluminium-Silicon 12AN <0.025 mm, manufactured by ECKA Granules Germany GmbH).

4. Evaluation (1) Coating Uniformity

Each of the brazing materials of Examples and Comparative Examples was melted at 100° C., fed into a cylindrical mold (10-cm aluminum siphon cake mold) with a diameter of 10 cm (inner diameter of 9 cm), and left to stand at room temperature for one hour to be solidified. A rotational shaft was inserted into the inner space of the obtained cylindrical sample, and the sample was shaved so that the curved surface had a width of 5 cm and was parallel to the rotational shaft to produce a sample for application.

Subsequently, the obtained cylindrical sample was set in a solid material pressing machine (manufactured by DAISEKI Co., Ltd.) and pressed against an aluminum substrate (length: 250 m, width: 5 cm, thickness: 100 μm) being conveyed at 150 m/min. At this time, the rotational shaft of the sample was rotated at 2000 rpm with a drill (manufactured by Makita Corporation, DF-458D), with a set load of 10 kg.

In this manner, the aluminum substrate in which the brazing material was applied in a solid state was obtained.

Thereafter, the application uniformity was evaluated as superior or inferior based on the following criteria. The results are shown in Tables 1 and 2.

In other words, the obtained test piece of the aluminum substrate was observed by an optical microscope (digital microscope VHX-1000 manufactured by KEYENCE CORPORATION) under predetermined conditions (magnification: 20× Illumination: Ring light Intensity of illumination: 50% reflected light was removed).

A binarization was carried out by setting a threshold of 140, and an upper limit of 255 and a lower limit of 0 for the brightness of the observed image.

Thereafter, provided that a (bright) region with a high brightness in the obtained observed image was a region in which the coating film was formed, a ratio of the coating film formation region (an area of the coating film) to the whole image was calculated and evaluated by the following criteria. The larger the coating film area was, the greater the uniformity was.

S: The coating film area was less than 100% and 92% or more.

A: The coating film area was less than 91% and 84% or more.

B: The coating film area was less than 83% and 76% or more.

C: The coating film area was less than 75% and 66% or more.

Bad: The coating film area was 66% or less.

✗: Due to the difficulty in forming a coating film, the coating film area was corrected as follows to evaluate.

In other words, when the brazing material was melted at 100° C. to prepare a sample for application, the brazing material did not become a homogeneous liquid. In addition, the melted brazing material was not formed into a desired cylindrical shape and had a curved surface with an irregular shape, even by feeding the melted brazing material into the cylindrical mold and shaving the solidified brazing material. Then, the obtained sample was applied on the aluminum substrate. The obtained coating film had a part (film hole) where the sample was not applied. Thus, "an assumed coating film area" of the obtained coating film was corrected as follows, and evaluated as "the coating film area".

More specifically, before the application of the sample, a solution containing a pigment was applied on the curved surface of the sample. The surface shape was transferred to a sheet of paper and the transferred paper was taken as an image by a scanner. Subsequently, the transferred image was subjected to a binarization by image analysis software ImageJ (Wayne Rasband, version 1.52a). For the binarization, 95% or less of the number of counts with respect to the peak of the transferred image was set as the threshold. Thereafter, a ratio of a contact area of the actual sample and the paper sheet to a desired transferred shape (a contact area of the sample with a desired shape and the paper sheet) was measured and used as a correction parameter. Then, the coating film area was corrected in conformity to the following formula.

Corrected coating film area=Assumed coating film area before correction/Correction parameter (2) Brazing Properties (2-1) Appearance Each of the brazing materials of Examples and Comparative Examples was heated at 90° C. and melted, and then, applied to an aluminum member (150 mm× 70 mm× 0.8 mm) with a 10-mm diameter circle so that an amount of application of the fluoride-based flux was 10 g/m², and a test piece was produced.

Thereafter, the above-described test piece was heated at 600° C. and brazed using a brazing furnace (box-type electric oven, manufactured by NORITAKE TCF, Co., Limited, A (V)-DC-M) under a nitrogen gas atmosphere (oxygen concentration of 100 ppm or less).

Then, the superiority and inferiority of the performance were evaluated in the following test. The results are shown in Tables 1 and 2.

The appearance after the brazing test was visually evaluated based on the following criteria.

A: Black was hardly seen.

B: Black was seen in a part of the application region.

(2-2) Shortage of Brazing

After each of the brazing materials of Examples and Comparative Examples was heated at 90° C. and melted, it was applied to the entire surface of an aluminum member (JIS-BAS121P (cladding rate of 10%), 60 mm× 25 mm× 1.0 mm) made of a brazing sheet clad with a silicon-aluminum alloy (brazing filler metal) on an aluminum alloy by brushing so that an amount of application of the fluoride-based flux was 10 g/m² to be produced as a horizontal member. Next, an aluminum alloy (JIS-A3003, 55 mm×25 mm×1.0 mm) as a vertical member was installed to the horizontal member in an inverted T-shape and fixed with a stainless steel wire to produce a test piece for brazing evaluation.

Thereafter, the above-described test piece was heated at 600° C. and brazed using a brazing furnace (box-type electric oven, manufactured by NORITAKE TCF, Co., Limited, A (V)-DC-M) under a nitrogen gas atmosphere (oxygen concentration of 100 ppm or less).

Then, the superiority and inferiority of the performance were evaluated in the following test. The results are shown in Tables 1 and 2.

A fillet after the brazing test was visually evaluated based on the following criteria:

Good: A fillet was formed uninterruptedly throughout the area where the horizontal member and the vertical member were in contact.

Bad: Although a fillet was formed in a part of the area where the horizontal member and the vertical member are in contact, the dispersibility of the fluoride-based flux was poor and the application was not uniformly carried out, so that discontinuation was confirmed in the fillet.

(3) Adhesion of Coating Film

Each of the brazing materials of Examples and Comparative Examples was melted at 100° C., fed into a cylindrical mold (10-cm aluminum siphon cake mold) with a diameter of 10 cm (inner diameter of 9 cm), and left to stand at room temperature for one hour to be solidified. A rotational shaft was inserted into the inner space of the obtained cylindrical sample, and the sample was shaved so that the curved surface had a width of 5 cm and was parallel to the rotational axis to produce a sample for application.

Subsequently, the obtained cylindrical sample was set in a solid material pressing machine (manufactured by DAISEKI Co., Ltd.) and pressed against an aluminum substrate (length: 250 m, width: 5 cm, thickness: 100 μm)

being conveyed at 150 m/min. At this time, the rotational shaft of the sample was rotated at 2000 rpm with a drill (manufactured by Makita Corporation, DF-458D), with a set load of 10 kg.

In this manner, the aluminum substrate in which the brazing material was applied in a solid state was obtained.

Thereafter, the adhesion of the coating film was evaluated as superior or inferior based on the following criteria. The results are shown in Tables 1 and 2.

In other words, the obtained test piece was subjected to a friction test using TriboGear (manufactured by Shinto Scientific Co., Ltd.) under predetermined conditions (speed: 60 mm/min, scale: 7 mm, count: single, traction: 20N, steel wool: Bon Star #0000) to evaluate the adhesion of the coating film to the aluminum substrate.

S: When a loaf of 50 g was applied, there was no exposure of the substrate caused by a fall of the coating film.

A: When a loaf of 40 g was applied, there was no exposure of the substrate caused by a fall of the coating film.

B: When a loaf of 30 g was applied, there was no exposure of the substrate caused by a fall of the coating film.

C: When a loaf of 10 g was applied, there was no exposure of the substrate caused by a fall of the coating film.

D: When a loaf of 5 g was applied, there was no exposure of the substrate caused by a fall of the coating film.

TABLE 1

| | | No. | Comp. Ex. 1 | Comp. Ex. 2 | Comp. Ex. 3 | Ex. 1 | Ex. 2 | Ex. 3 |
|---|---|---|---|---|---|---|---|---|
| Composition | Brazing filler metal | Al-12% Si | — | — | — | — | — | — |
| | Fluoride-based flux | K—Al—F flux | 50.0% | 50.0% | 50.0% | 50.0% | 50.0% | 50.0% |
| | Solidifying agent | Paraffin wax | 50.0% | 45.0% | 45.0% | 45.0% | 45.0% | 45.0% |
| | | Stearyl alcohol | — | — | — | — | — | — |
| | Coating film uniformity agent | SteAc-VEEA (full width at half maximum of 4.5°) | — | — | — | 5.0% | — | — |
| | | SteAc-VEEM (full width at half maximum of 4.5°) | — | — | — | — | 5.0% | — |
| | | Stearyl methacrylate (full width at half maximum of 1.0°) | — | — | — | — | — | 5.0% |
| | | Methoxy methyl butane stearate (full width at half maximum of 1.1°) | — | — | — | — | — | — |
| | | Methyl stearate (full width at half maximum of 3.3°) | — | — | — | — | — | — |
| | | Butyl stearate (full width at half maximum of 3.8°) | — | — | — | — | — | — |
| | | Butyl dicaprate (full width at half maximum of 2.0°) | — | — | — | — | — | — |
| | | Hexyl dicaprate (full width at half maximum of 1.5°) | — | — | — | — | — | — |
| | | Anhydrous stearyl phthalate (full width at half maximum of 3.5°) | — | — | — | — | — | — |
| | | Methyl lignocerate (full width at half maximum of 3.0°) | — | — | — | — | — | — |
| | | Methyl palmitate (full width at half maximum of 3.4°) | — | — | — | — | — | — |
| | | Methyl myristate (full width at half maximum of 3.4°) | — | — | — | — | — | — |
| | Polyethylene (full width at half maximum of 4.5°) | | — | — | 5.0% | — | — | — |
| | Stearic acid (full width at half maximum of 0.4°) | | — | 5.0% | — | — | — | — |
| Evaluation | Coating uniformity | | Bad·X· | Bad | Bad | S | S | C |
| | Brazing properties | Appearance | A | B | B | A | A | A |
| | | Shortage of brazing | Good | Good | Bad | Good | Good | Good |
| | Coating film adhesion | | S | S | D | S | S | S |

| | | No. | Ex. 4 | Ex. 5 | Ex. 6 | Ex. 7 | Ex. 8 | Ex. 9 |
|---|---|---|---|---|---|---|---|---|
| Composition | Brazing filler metal | Al-12% Si | — | — | — | — | — | — |
| | Fluoride-based flux | K—Al—F flux | 50.0% | 50.0% | 50.0% | 50.0% | 50.0% | 50.0% |
| | Solidifying agent | Paraffin wax | 45.0% | 45.0% | 45.0% | 45.0% | 45.0% | 45.0% |
| | | Stearyl alcohol | — | — | — | — | — | — |
| | Coating film uniformity agent | SteAc-VEEA (full width at half maximum of 4.5°) | — | — | — | — | — | — |

TABLE 1-continued

| | | | | | | | |
|---|---|---|---|---|---|---|---|
| | SteAc-VEEM (full width at half maximum of 4.5°) | — | — | — | — | — | — |
| | Stearyl methacrylate (full width at half maximum of 1.0°) | — | — | — | — | — | — |
| | Methoxy methyl butane stearate (full width at half maximum of 1.1°) | 5.0% | — | — | — | — | — |
| | Methyl stearate (full width at half maximum of 3.3°) | — | 5.0% | — | — | — | — |
| | Butyl stearate (full width at half maximum of 3.8°) | — | — | 5.0% | — | — | — |
| | Butyl dicaprate (full width at half maximum of 2.0°) | — | — | — | 5.0% | — | — |
| | Hexyl dicaprate (full width at half maximum of 1.5°) | — | — | — | — | 5.0% | — |
| | Anhydrous stearyl phthalate (full width at half maximum of 3.5°) | — | — | — | — | — | 5.0% |
| | Methyl lignocerate (full width at half maximum of 3.0°) | — | — | — | — | — | — |
| | Methyl palmitate (full width at half maximum of 3.4°) | — | — | — | — | — | — |
| | Methyl myristate (full width at half maximum of 3.4°) | — | — | — | — | — | — |
| | Polyethylene (full width at half maximum of 4.5°) | — | — | — | — | — | — |
| | Stearic acid (full width at half maximum of 0.4°) | — | — | — | — | — | — |
| Evaluation | Coating uniformity | C | A | S | B | C | S |
| | Brazing properties  Appearance | A | A | A | A | A | B |
| | Shortage of brazing | Good | Good | Good | Good | Good | Good |
| | Coating film adhesion | C | S | S | D | D | S |

TABLE 2

| | No. | | Ex. 10 | Ex. 11 | Ex. 12 | Ex. 13 | Ex. 14 | Ex. 15 | Ex. 16 |
|---|---|---|---|---|---|---|---|---|---|
| Composition | Brazing filler metal | Al-12% Si | — | — | — | — | — | — | — |
| | Fluoride-based flux | K—Al—F flux | 1.0% | 1.0% | 1.0% | 1.0% | 1.0% | 12.0% | 30.0% |
| | Solidifying agent | Paraffin wax | 98.0% | 90.0% | 70.0% | 50.0% | 30.0% | 50.0% | 50.0% |
| | | Stearyl alcohol | — | — | — | — | — | — | — |
| | Coating film uniformity agent | SteAc-VEEA (full width at half maximum of 4.5°) | — | — | — | — | — | — | — |
| | | SteAc-VEEM (full width at half maximum of 4.5°) | — | — | — | — | — | — | — |
| | | Stearyl methacrylate (full width at half maximum of 1.0°) | — | — | — | — | — | — | — |
| | | Methoxy methyl butane stearate (full width at half maximum of 1.1°) | — | — | — | — | — | — | — |
| | | Methyl stearate (full width at half maximum of 3.3°) | 1.0% | 9.0% | 29.0% | 49.0% | 69.0% | 38.0% | 20.0% |
| | | Butyl stearate (full width at half maximum of 3.8°) | — | — | — | — | — | — | — |
| | | Butyl dicaprate (full width at half maximum of 2.0°) | — | — | — | — | — | — | — |
| | | Hexyl dicaprate (full width at half maximum of 1.5°) | — | — | — | — | — | — | — |

TABLE 2-continued

|  |  |  |  |  |  |  |  |  |
|---|---|---|---|---|---|---|---|---|
|  |  | Anhydrous stearyl phthalate (full width at half maximum of 3.5°) | — | — | — | — | — | — | — |
|  |  | Methyl lignocerate (full width at half maximum of 3.0°) | — | — | — | — | — | — | — |
|  |  | Methyl palmitate (full width at half maximum of 3.4°) | — | — | — | — | — | — | — |
|  |  | Methyl myristate (full width at half maximum of 3.4°) | — | — | — | — | — | — | — |
|  | Polyethylene (full width at half maximum of 4.5°) |  | — | — | — | — | — | — | — |
|  | Stearic acid (full width at half maximum of 0.4°) |  | — | — | — | — | — | — | — |
| Eval- | Coating uniformity |  | C | S | A | B | C | B | B |
| uation | Brazing properties | Appearance | A | A | A | A | A | A | A |
|  |  | Shortage of brazing | Good | Good | Good | Good | Good | Good | Good |
|  | Coating film adhesion |  | S | S | A | B | C | B | A |

|  |  | No. | Ex. 17 | Ex. 18 | Ex. 19 | Ex. 20 | Ex. 21 | Ex. 22 |
|---|---|---|---|---|---|---|---|---|
| Compo- | Brazing filler metal | Al-12% Si | — | 30.0% | — | — | — | — |
| sition | Fluoride-based flux | K—Al—F flux | 70.0% | 20.0% | 50.0% | 50.0% | 50.0% | 50.0% |
|  | Solidifying agent | Paraffin wax | 25.0% | 45.0% | — | 45.0% | 45.0% | 45.0% |
|  |  | Stearyl alcohol | — | — | 45.0% | — | — | — |
|  | Coating film uniformity agent | SteAc-VEEA (full width at half maximum of 4.5°) | — | — | — | — | — | — |
|  |  | SteAc-VEEM (full width at half maximum of 4.5°) | — | — | — | — | — | — |
|  |  | Stearyl methacrylate (full width at half maximum of 1.0°) | — | — | — | — | — | — |
|  |  | Methoxy methyl butane stearate (full width at half maximum of 1.1°) | — | — | — | — | — | — |
|  |  | Methyl stearate (full width at half maximum of 3.3°) | 5.0% | 5.0% | 5.0% | — | — | — |
|  |  | Butyl stearate (full width at half maximum of 3.8°) | — | — | — | — | — | — |
|  |  | Butyl dicaprate (full width at half maximum of 2.0°) | — | — | — | — | — | — |
|  |  | Hexyl dicaprate (full width at half maximum of 1.5°) | — | — | — | — | — | — |
|  |  | Anhydrous stearyl phthalate (full width at half maximum of 3.5°) | — | — | — | — | — | — |
|  |  | Methyl lignocerate (full width at half maximum of 3.0°) | — | — | — | 5.0% | — | — |
|  |  | Methyl palmitate (full width at half maximum of 3.4°) | — | — | — | — | 5.0% | — |
|  |  | Methyl myristate (full width at half maximum of 3.4°) | — | — | — | — | — | 5.0% |
|  | Polyethylene (full width at half maximum of 4.5°) |  | — | — | — | — | — | — |
|  | Stearic acid (full width at half maximum of 0.4°) |  | — | — | — | — | — | — |
| Eval- | Coating uniformity |  | C | S | S | A | A | A |
| uation | Brazing properties | Appearance | A | A | A | A | A | A |
|  |  | Shortage of brazing | Good | Good | Good | Good | Good | Good |
|  | Coating film adhesion |  | S | S | S | S | B | C |

The details of each component in Tables are as follows.
 Brazing Filler Metal
Al-12% Si: Al brazing filler metal including 12% of Si, trade name: ECKA Aluminium-Silicon 12AN<0.025 mm, manufactured by ECKA Granules Germany GmbH
 Fluoride-Based Flux
K—Al—F Flux: trade name: NOCOLOK Flux, manufactured by Solvay Japan, Ltd.
 Solidifying Agent
Paraffin Wax: trade name Paraffin Wax-135, manufactured by NIPPON SEIRO CO., LTD.
Stearyl Alcohol: trade name: KALCOL 8098, Kao Corporation. (melting point of 59° C.)
 Coating Film Uniformity Agent
SteAc-VEEA: stearyl aldehyde methylethyl diethyl ether acrylate=acetal, full width at half maximum of 4.5°, Synthesis Example 1
SteAc-VEEM: stearyl aldehyde methylethyl diethyl ether methacrylate=acetal, full width at half maximum of 4.5°, Synthesis Example 2
Stearyl methacrylate: trade name SMA, manufactured by MITSUBISHI GAS CHEMICAL COMPANY, INC., full width at half maximum of 1.0, molecular weight of 339
Methoxy methyl butane stearate: full width at half maximum of 1.1°, molecular weight of 384, Synthesis Example 3
Methyl stearate: trade name methyl stearate 95, manufactured by NOF CORPORATION, full width at half maximum of 3.3°, molecular weight of 298
Butyl stearate: trade name butyl stearate, manufactured by NOF CORPORATION, full width at half maximum of 3.8°, molecular weight of 340
Butyl dicaprate: full width at half maximum of 2.0°, molecular weight of 398, Synthesis Example 4
Hexyl dicaprate: full width at half maximum of 1.5°, molecular weight of 426, Synthesis Example 5
Anhydrous stearyl phthalate: full width at half maximum of 3.5°, molecular weight of 438, Synthesis Example 6
Methyl lignocerate: trade name Methyl Lignocerate, manufactured by Tokyo Chemical Industry Co., Ltd., full width at half maximum of 3.0°, molecular weight of 382
Methyl palmitate: trade name Methyl Palmitate, manufactured by Tokyo Chemical Industry Co., full width at half maximum of 3.4°, molecular weight of 270
Methyl myristate: trade name Methyl Myristate, manufactured by Tokyo Chemical Industry Co., full width at half maximum of 3.4°, molecular weight of 242
Polyethylene: trade name Niporon Hard 7300A, manufactured by Tosoh Corporation, full width at half maximum of 4.5°, molecular weight of 20,000

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The brazing material and brazing member of the present invention are suitably used for the production of heat exchangers including aluminum or an aluminum alloy.

The invention claimed is:
1. A brazing material for brazing aluminum or an aluminum alloy, the brazing material comprising:
 fluoride-based flux;
 a solidifying agent; and
 a coating film uniformity agent, and
 being solid at 25° C.,
 wherein the coating film uniformity agent has a full width at half maximum of 1° or more of a peak with the largest peak width in a range of diffraction angles of (2θ)19+2° in an X-ray diffraction pattern obtained at 10° C., and
 the coating film uniformity agent is at least one compound selected from the group consisting of an ester of a carboxylic acid having 10 or more carbon atoms and an alcohol having less than 8 carbon atoms, an ester of a carboxylic acid having less than 10 carbon atoms and an alcohol having 8 or more carbon atoms, and an acetal having 10 or more carbon atoms.
2. The brazing material according to claim 1, wherein the coating film uniformity agent has a molecular weight of 1000 or less.
3. The brazing material according to claim 1, wherein the full width at half maximum of the coating film uniformity agent is 1° or more and 10° or less.
4. The brazing material according to claim 1, further comprising:
 a brazing material powder, wherein the brazing material powder consists of a metal capable of forming a eutectic alloy with aluminum, and/or an alloy of the metal and the aluminum.
5. A brazing member comprising:
 aluminum or an aluminum alloy; and
 a coating film formed by applying the brazing material according to claim 1 to the aluminum or the aluminum alloy.
6. A heat exchanger comprising the brazing member according to claim 5.

* * * * *